Oct. 14, 1924.

C. BETHEL

FLEXIBLE SHAFT

Filed June 22, 1922

1,511,390

WITNESSES:
R. J. Butler.
W. B. Jaspert.

INVENTOR
Claude Bethel.
BY
Wesley G. Carr
ATTORNEY

Patented Oct. 14, 1924.

1,511,390

UNITED STATES PATENT OFFICE.

CLAUDE BETHEL, OF WILKINSBURG, PENNSYLVANIA, ASSIGNOR TO WESTINGHOUSE ELECTRIC & MANUFACTURING COMPANY, A CORPORATION OF PENNSYLVANIA.

FLEXIBLE SHAFT.

Application filed June 22, 1922. Serial No. 570,047.

*To all whom it may concern:*

Be it known that I, CLAUDE BETHEL, a citizen of the United States, and a resident of Wilkinsburg, in the county of Allegheny and State of Pennsylvania, have invented a new and useful Improvement in Flexible Shafts, of which the following is a specification.

My invention relates to gear driving mechanism, more especially to gearing mechanism employed in electric locomotive drives.

It is among the objects of this invention to provide a flexible gear mounting for electrical locomotive drives which shall be of simple compact structure, which shall provide ready access to its various operating parts and which shall be provided with a self-contained lubricating system for lubricating the operating parts.

It is a further object of this invention to provide a structure of this general character which shall be adapted to relieve sudden stresses applied to the gear teeth and shaft.

On gear trains subjected to sudden shocks or impacts, as in electrical railway driving mechanisms where the impulses are transmitted by the motors in accelerating and by sudden stops, it is necessary to provide flexible or yielding connections between the driving motors and the traction wheels. Various types of flexible gears have been proposed which generally embody the well-known quill drives in which spring members are disposed between the gear rims and the hubs for the purpose of absorbing sudden shocks or impacts transmitted to the gear teeth.

My present invention is designed to provide a yielding or flexible gear mounting which is effected by the double functioning of a flexible shaft and a yielding connection between said shaft and gear.

In the accompanying drawing constituting a part hereof and in which like reference numerals designate like parts, Figure 1 is a sectional view of a flexible gear and shaft structure embodying the principles of this invention;

Figure 1:
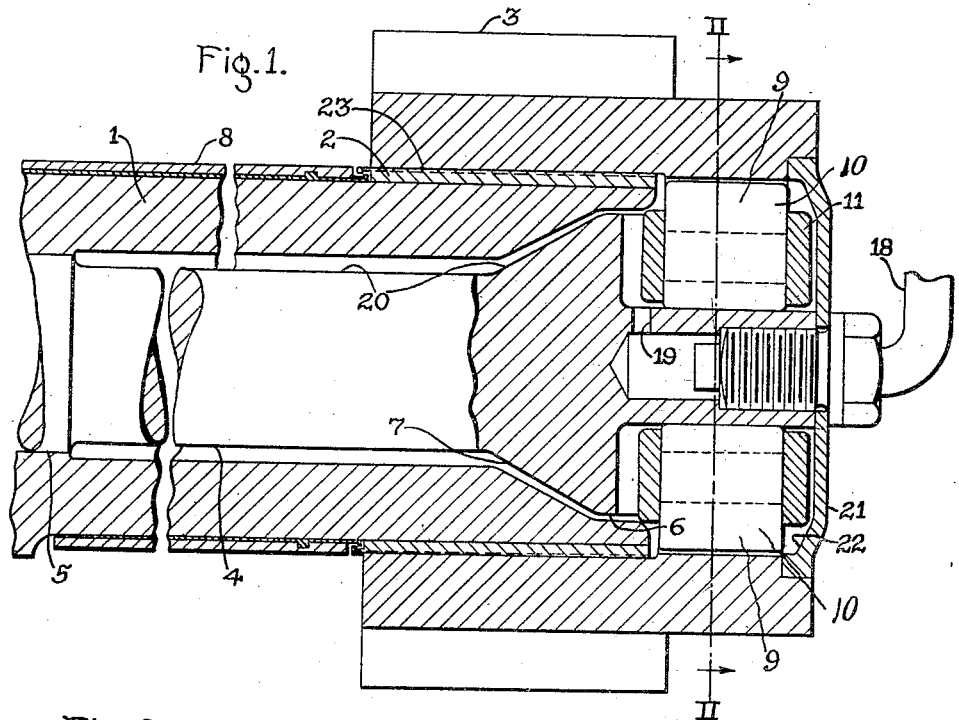
Figure 2:
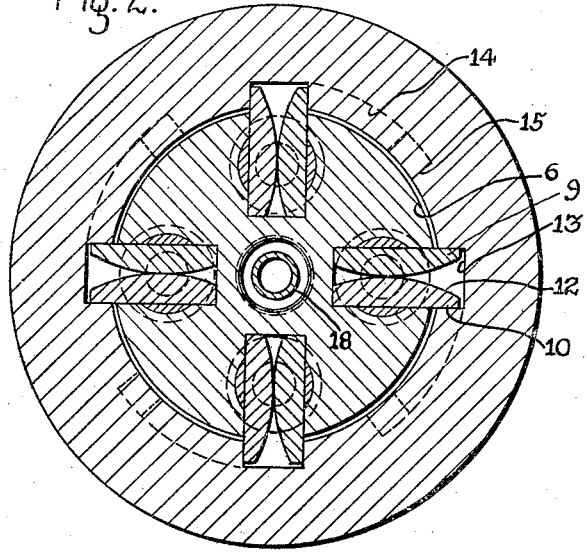
Fig. 2 is a sectional view thereof taken along the line II—II of Fig. 1.

Referring to the Fig. 1, the flexible structure designated consists of a shaft 1, such as the armature shaft of a motor having a solid sleeve 2, secured thereto which constitutes the bearing surface of a gear or pinion 3. A shaft 4 having a reduced body portion is inserted in the shaft 1 and secured thereto in a suitable manner, as by a press fit at the end 5. The shaft 4 is provided with an enlarged end or head 6 having a tapered shoulder 7 which is located in a correspondingly shaped recess of the shaft 1. A bushing 8, secured in the motor housing (not shown), constitutes the main bearing for the armature shaft 1. The gear 3, rotatably mounted on the sleeve 2, is secured to the flexible shaft 4 by a plurality of yielding keys 9.

Figure 3:
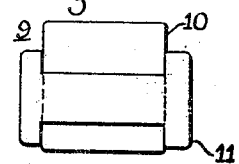
Fig. 3 is a side elevational view of one of the flexible keys employed in securing the gear to the shaft.

The keys 9 (Fig. 3) comprise a pair of springs 10 secured in a bushing 11 and are provided with curved surfaces 12 which are in co-operative relation to each other. The bushings 11 are rotatably mounted in the shaft 4 with the springs 10 in radial positions. The gear 3 is provided with a plurality of notches 13 adapted to receive the springs 10 projecting from the flexible shaft 4. The gear 3 is further provided with a plurality of annular grooves 14 formed centrally with the enlarged end 6 of the shaft 4 which are adapted to receive a correspondingly shaped lug 15 projecting on the shaft 4 which are positioned by inserting them through the notches 13 and then rotating them in the groove 14 to their respective positions.

Figure 4:
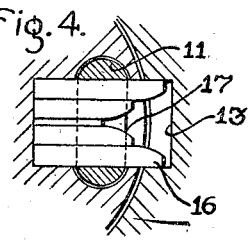
Fig. 4 is a sectional view, partially in elevation, of a modified form of a flexible key showing its position relative to the gear and shaft.

As shown in the Fig. 4, the flexible key may consist of a plurality of long springs 16 projecting into the notches 13 of the gear and a plurality of short springs 17 which are disposed between the projecting members 16. A cover 21 is secured to the end of the gear 3 to provide a lubricating chamber or oil reservoir 22 which communicates with the other parts of the lubricating system The flexible keys, shaft and gear are lubricated from a common supply reservoir or pump connected by the pipe 18 which is secured to the flexible shaft 4 from which it connects, through the opening 19, to the flexible keys, thence through the clearance 20 between the two shafts 1 and 4. The gear bearing 2 is provided with an oil groove 23 communicating with the lubricating chamber 22.

The operation of my device is briefly as follows: When torque is applied to the teeth of the gear or pinion 3, tending to rotate it upon the bushing 8, the notches 12, being in engagement with the flexible keys 10 projecting therein, will evenly distribute the load on all of the spring members. The springs 10 are so constructed that they will tend to move on their curved engaging surfaces 12 until the load is equally distributed upon all of the respective members. The keys 9, being mounted in the flexible shaft 4, will apply a tortional stress thereto which may be up to the elastic limit of the body of the shaft 4 without distorting it.

The clearance 20 provided between the flexible shaft 4 and the armature shaft 1, together with the relatively long body portion of the flexible shaft, will permit considerable tortional movement of the shaft 4, as there is no binding engagement other than with the body portion by which it is secured.

From the above description of my invention, it is evident that the double yielding function of the flexible keys and shaft will permit considerable flexing at the working surface of the gear teeth, which is effective in relieving stresses imparted thereto from other parts of the driving mechanism.

It is also evident that the structure which I employ is mechanically strong and of a simple, compact design. This construction is advantageous for street-railway-motor application and electric-locomotive drives where the space between the gear members and the axle housings is very limited.

Although I have described a specific embodiment of my invention, it will be obvious to those skilled in the art that various changes may be made in the details of construction. For instance, the gear may be rotatably mounted directly upon the armature shaft provided suitable provision is made for the wear effected by their contact. The flexible shaft may be of various proportions in accordance with the specific application of service. The flexible key may be of any suitable shape and construction to provide a yielding contact with the gear or the lubrication may be effected in various ways depending upon the particular system available. It is also evident that, when space permits and when the additional flexibility due to flexible keys is not essential, the pinion may be secured to the flexible shaft by the various means known to the art. These and other changes may be made in the details of construction without departing from the principles herein set forth.

I claim as my invention:

1. A flexible gear mounting comprising a hollow shaft, a shaft disposed within said hollow shaft and secured thereto at one end, and a gear rotatably mounted on said hollow shaft and yieldingly secured to the inner shaft.

2. A flexible gear mounting comprising a hollow shaft, a shaft disposed within said hollow shaft and engaging said shaft at one end, and a gear rotatably mounted on said hollow shaft and yieldingly secured to the inner shaft.

3. A flexible gear mounting comprising a hollow shaft, a shaft disposed within said hollow shaft intimately engaging the same at one end, and a gear rotatably mounted on said hollow shaft and yieldingly secured to the inner shaft.

4. A flexible gear mounting comprising a hollow shaft, a shaft disposed within said hollow shaft intimately engaging the same at one end and having the remaining body portion of smaller diameter than the opening of said hollow shaft, and a gear rotatably mounted on said hollow shaft and yieldingly secured to the inner shaft.

5. A flexible gear mounting comprising a hollow shaft, a shaft disposed within said hollow shaft intimately engaging the same at one end and having the remaining body portion of smaller diameter than the opening of said hollow shaft, and a gear rotatably mounted on said hollow shaft and yieldingly secured to the inner shaft by a plurality of flexible keys.

6. A flexible gear mounting comprising a hollow shaft, a shaft disposed within said hollow shaft and intimately engaging the same at one end and having the remaining body portion of smaller diameter than the opening of said hollow shaft, and a gear rotatably mounted on said hollow shaft and yieldingly secured to the inner shaft by a plurality of bifurcated keys.

7. A flexible gear mounting comprising a hollow shaft, a shaft disposed within said hollow shaft and intimately engaging the same at one end and having the remaining body portion of smaller diameter than the opening of said hollow shaft, and a gear rotatably mounted on said hollow shaft and yieldingly secured to the inner shaft by a plurality of bifurcated keys, said keys being adapted to yield when subjected to tortional stress.

8. A flexible gear mounting comprising a hollow shaft, a shaft disposed within said hollow shaft and intimately engaging the same at one end and having the remaining body portion of smaller diameter than the opening of said hollow shaft, and a gear rotatably mounted on said hollow shaft and yieldingly secured to the inner shaft by a plurality of bifurcated keys, said keys being adapted to yield in opposite directions when subjected to tortional stress.

9. A flexible gear mounting comprising a hollow shaft, a shaft disposed within said hollow shaft having an enlarged end, said shaft having its small end in intimate engagement with said hollow shaft, a bushing disposed on the end of said hollow shaft, a gear rotatably mounted on said bushing and yieldingly connected to the inner shaft by a plurality of flexible elements and a cover secured to the end of said gear to provide a lubricating chamber.

In testimony whereof, I have hereunto subscribed my name this 15th day of June, 1922.

CLAUDE BETHEL.